United States Patent [19]

Harper

[11] Patent Number: 4,970,786
[45] Date of Patent: Nov. 20, 1990

[54] PRODUCE PEELING DEVICE

[76] Inventor: Art Harper, P.O. Box 574, Garden Grove, Calif. 90680

[21] Appl. No.: 431,992

[22] Filed: Nov. 6, 1989

[51] Int. Cl.⁵ .......................................... B26B 11/00
[52] U.S. Cl. ................... 30/123.7; 30/113.1; 30/114; 30/356
[58] Field of Search ............... 30/113.1, 123.7, 356, 30/299, 304, 305, 113.3, 114

[56] References Cited

U.S. PATENT DOCUMENTS

| | | | |
|---|---|---|---|
| 1,452,930 | 4/1923 | Polk | 30/356 |
| 2,522,054 | 9/1950 | Novak | 30/123.7 |
| 3,149,417 | 9/1964 | Lowry | |
| 3,237,299 | 3/1966 | Gibbs | 30/123.7 |
| 3,618,208 | 11/1971 | Cronheim | |
| 3,913,226 | 10/1975 | Lovato et al. | 30/123.5 |

Primary Examiner—Douglas D. Watts

[57] ABSTRACT

A curved knife for manually peeling produce and especially for simultaneously peeling the sides and bottom of produce halves, such as avocados and melons, while keeping the flesh in one intact piece as the device is rotated around the interior wall of the skin; and to facilitate quick and easy peeling thereof, by employing a wide, thin, curved blade member, with a non-snag cutting edge; said blade member being integrally connected to one end of an elongated handle.

11 Claims, 4 Drawing Sheets

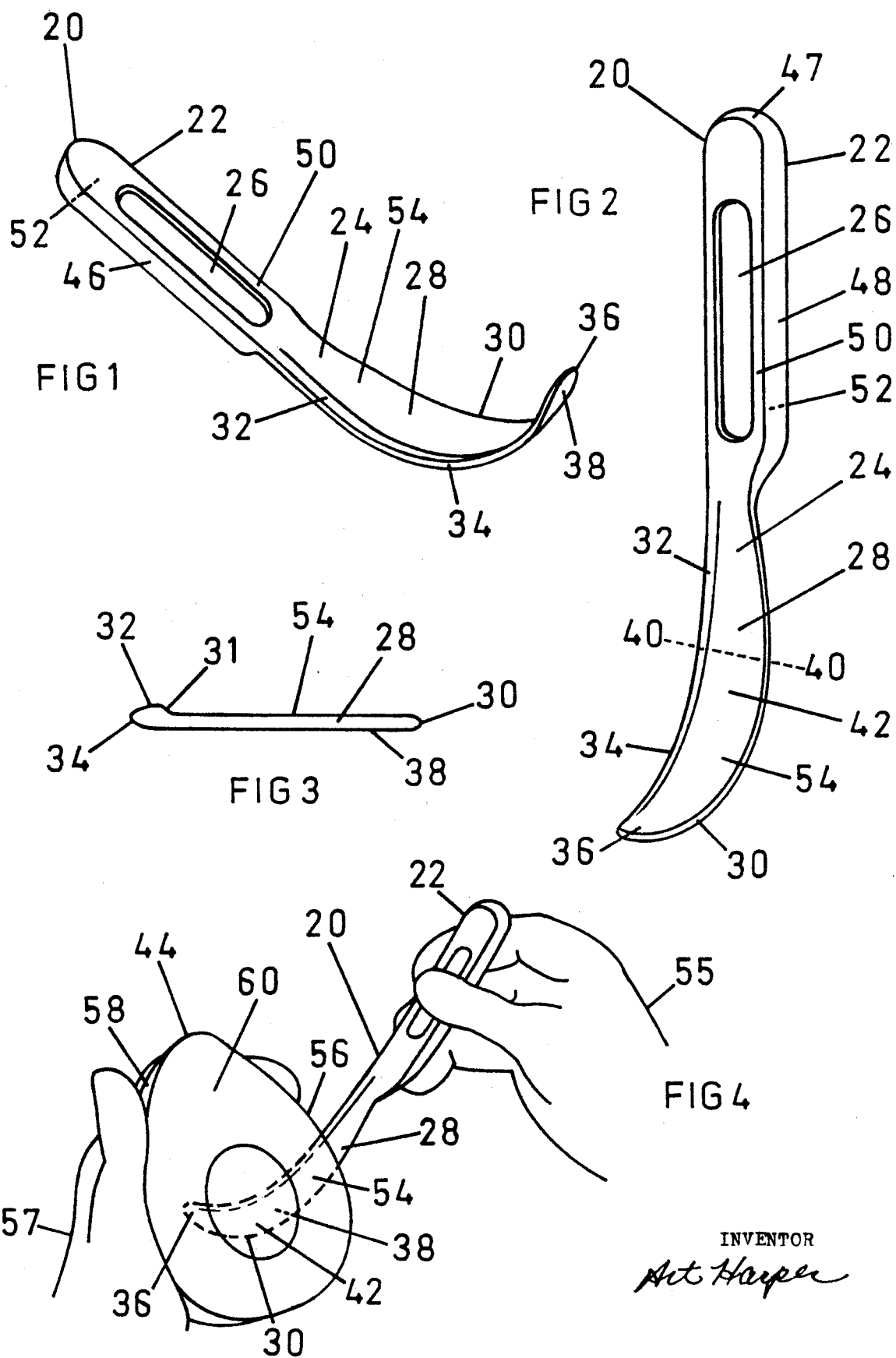

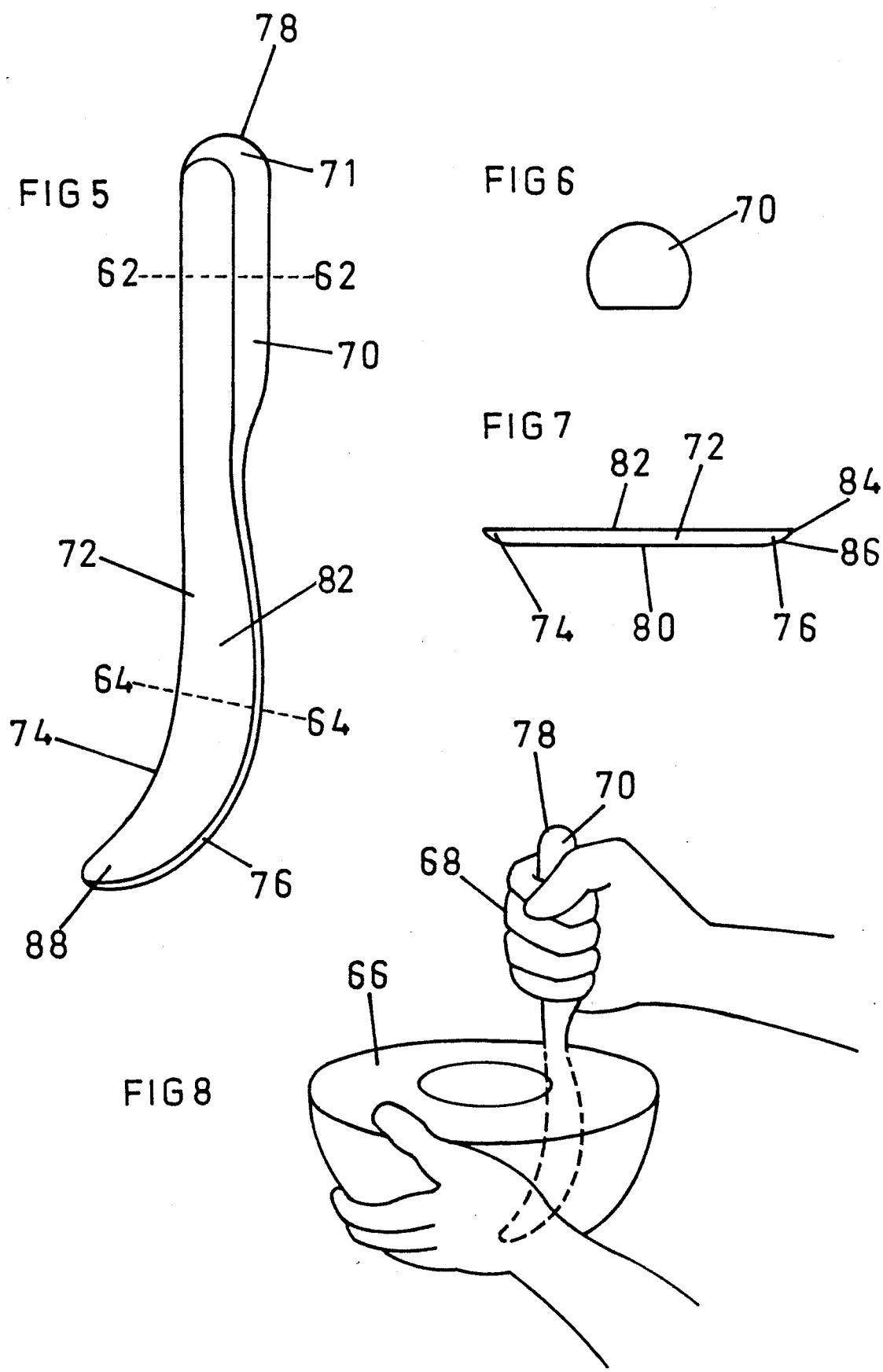

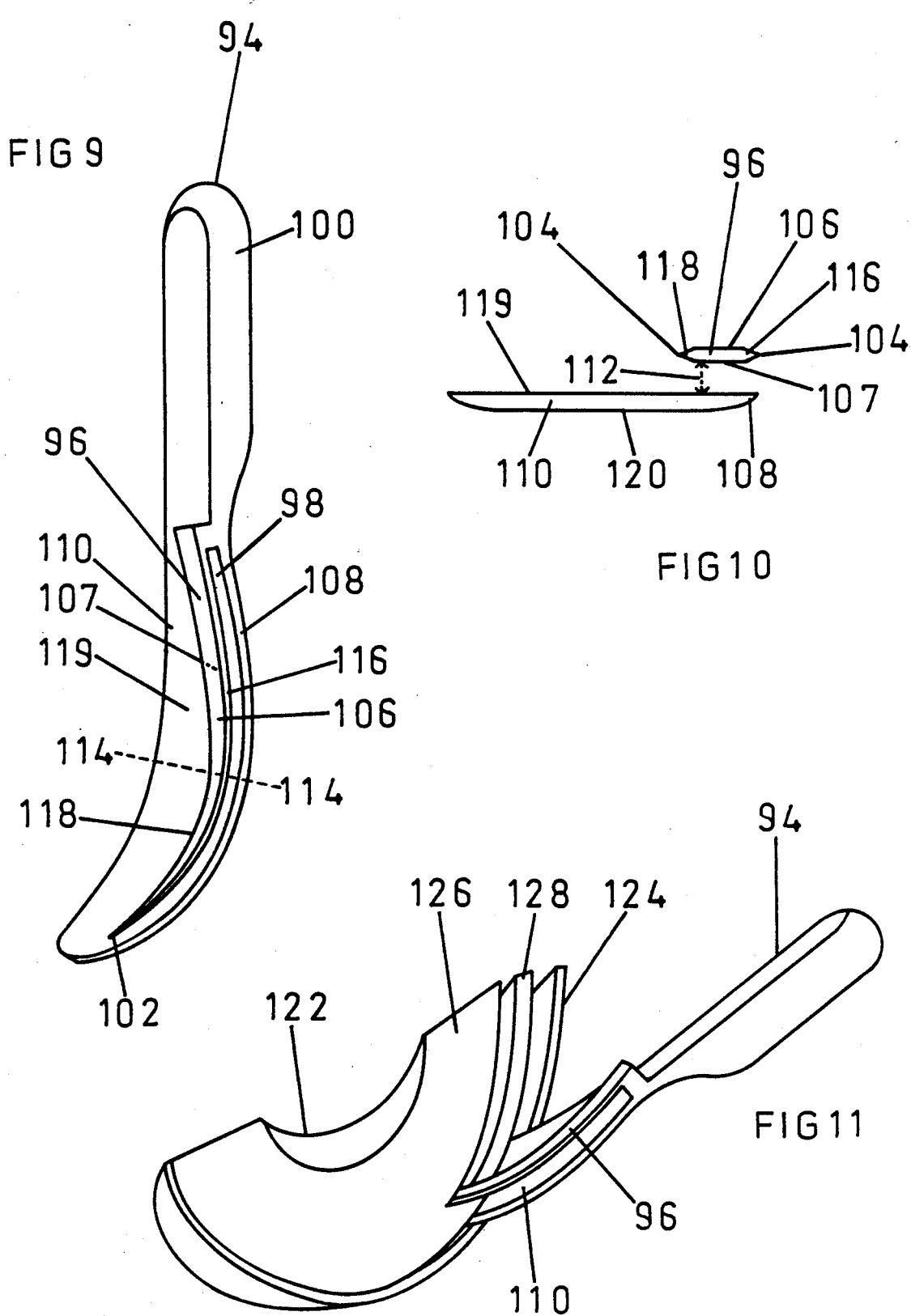

FIG 12
FIG 13
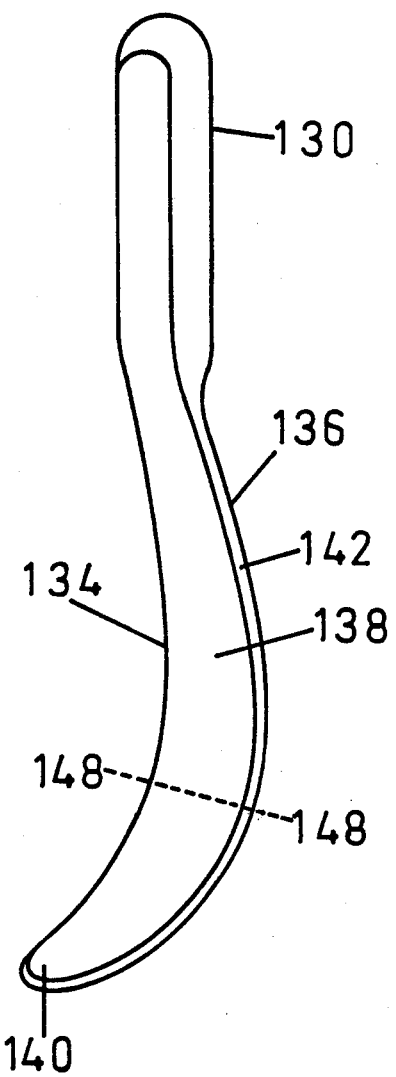
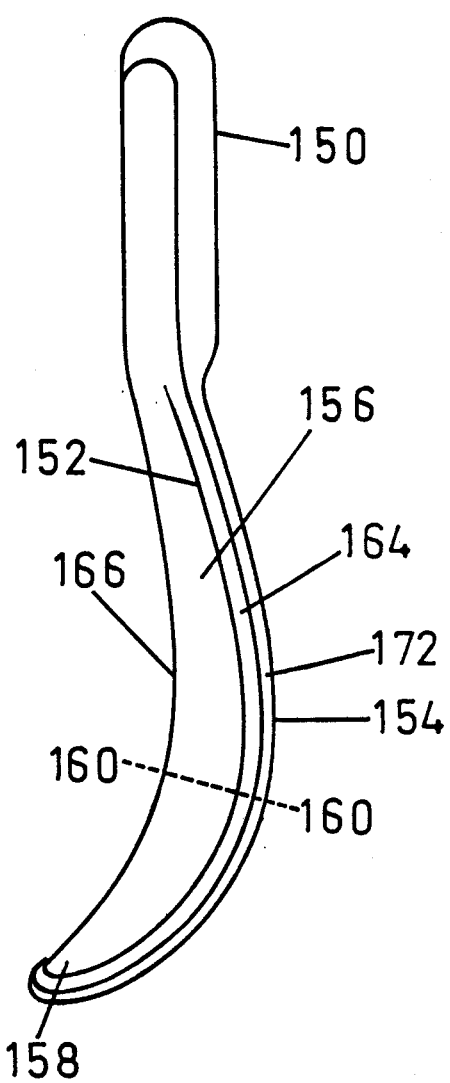
FIG 14
FIG 15
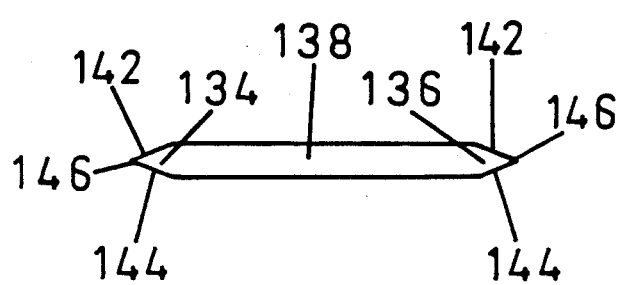
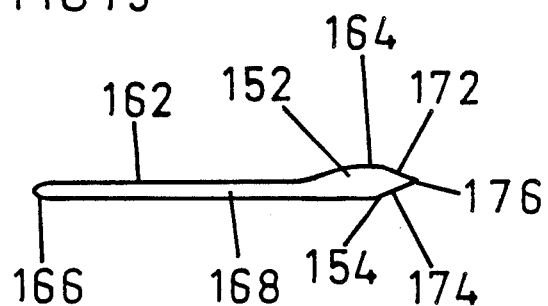

PRODUCE PEELING DEVICE

FIELD OF INVENTION

This invention relates to produce peeling knives and more directly to a curved, peeling blade member, for removing the skin of avocados, melons, squash and other similar fruits and vegetables, to facilitate easy peeling thereof.

DESCRIPTION OF PRIOR ART

Citrus fruit peelers and the use of other cutlery to peel fruits and vegetables are well known. The use of curved blades and probes, that conform to the general contour of the fruit or other devices to attempt to remove the skin of produce, are also well known. All of these devices although useful in part, are not easily used to peel certain fruits and vegetables, such as avocados, melons and cooked squash. Devices such as a curved rod, which may be inserted between the skin and the flesh, to attempt to peel the sides and bottom of a halved fruit, are narrow and blunt and designed to pull apart the flesh from the skin. Should a thick curved rod be used to cut the flesh from the skin, it would be difficult to push the probe through the flesh. Such devices are also impractical to smoothly guide the movement of their probes parallel against the interior of the skin wall and control the direction thereof.

Devices employing a curved blade member, such as grapefruit knives and similar citrus peeling knives, are often too sharp and serrated to glide over the interior of the skin, without puncturing and snagging the skin. Those devices often have only a portion of their cutting blade member curved, at a location distant from the tip, thereby limiting the depth of the cutting blade member by requiring the stretching of a substantial portion of the skin, in order to sever the bottom of a produce half. Curved rods and curved blade members are especially a problem, when the interior of the skin has an irregular contour, such as a watermelon and would require great skill in peeling, without snagging. Such devices are also unsuitable to peel thin skinned fruit, such as the winter varieties of avocados. Produce having a thin skin, can easily be punctured by a sharp cutting blade member or by a relatively narrow probe.

Should a straight blade member be used to remove strips of skin, the work is slow and tedious. The flesh of such produce as avocados and melons, is soft and juicy and difficult to peel, without messing yourself and the work area. When employing all such known devices, it often requires more time in peeling and cleaning up thereafter.

SUMMARY OF THE INVENTION

The present invention overcomes these limitations by providing a manually operated device, that has a substantially wide, flat, curved, blade member, with a non-snag cutting edge and that is connected to one end of an elongated handle.

In use, the blade member of the device is inserted between the skin and the flesh of a halved produce, then the blade member is rotated around the produce skin wall, until the flesh is cut away from the skin. The flesh can then be removed perfectly intact.

The device can even be used for peeling when a produce is cut in wedged portions. Proportionally larger and also smaller sizes of the present invention, can be used to peel such produce as kiwi, cantaloupe, watermelon, cooked vegetables and avocados. To facilitate a clearer perception of the invention, its use will be directed primarily to the avocado and melon groups.

SUMMARY OF OBJECTIVES OF THE INVENTION

The primary objective of this invention is to provide a manual fruit and vegetable peeling tool, that can quickly remove the skin of avocados, melons and other similar produce and for which may be used to accomplish this purpose, with a minimum of difficulty for the user.

Another objective of this invention, is to provide a tool that has a curved blade member, that conforms to the general contour of the produce, for which the curved portion is of a substantial length, whereby the cutting edge can cut the bottom as well as the sides of a halved produce from its skin and in one intact piece, without bruising the delicate flesh.

Another objective of this invention is to provide a relatively wide, thin blade member, that allows for more surface area against the skin wall, to prevent breaking through the skin thereof and to also aid the user in guiding the cutting edge, by keeping the blade member generally parallel to the skin, whereat the flesh may be cut from the skin without damage thereto.

A further objective of this invention is to provide a blade member with a non-snag cutting edge, that allows the cutting edge to glide smoothly over the surface of the interior skin wall, without cutting the skin thereof, while still being able to cut the flesh of a produce.

Still another objective is to provide an invention that is easily manufactured and capable of multiple uses.

Other objectives and advantages of this invention will be made clear and readily appreciated as they become better understood by reference to the following detailed description and drawing:

BRIEF DESCRIPTION OF THE DRAWING

FIG. 1: Illustrates a perspective, bottom view of the invention;

FIG. 2: Illustrates a perspective, front view of the invention;

FIG. 3: Illustrates an enlarged profile of the cross-sectional view of the blade member at line 40—40 of FIG. 2;

FIG. 4: Illustrates a perspective, front view of the invention, peeling the bottom and sides of an avocado;

FIG. 5: Illustrates a perspective, front view of a second embodiment of the invention;

FIG. 6: Illustrates a profile of the cross-sectional view of the handle at line 62—62 of FIG. 5;

FIG. 7: Illustrates an enlarged profile of the cross-sectional view of the blade member at line 64—64 of FIG. 5;

FIG. 8: Illustrates a perspective, front view of the second embodiment, peeling a cantaloupe;

FIG. 9: Illustrates a perspective, front view of a third embodiment of the invention;

FIG. 10: Illustrates an enlarged profile of the cross-sectional view of the blade member at line 114—114 of FIG. 9;

FIG. 11: Illustrates a perspective, side view of the third embodiment, peeling a cantaloupe;

FIG. 12: Illustrates a perspective, front view of a forth embodiment of the invention;

FIG. 13: Illustrates a perspective, front view of a fifth embodiment of the invention;

FIG. 14: Illustrates an enlarged profile of the cross-sectional view of the blade member at line 148-148 of FIG. 12; and FIG. 15: Illustrates an enlarged profile of the cross-sectional view of the blade member at line 160—160 of FIG. 13;

DESCRIPTION OF THE PREFERRED EMBODIMENT

Referring to FIGS. 1 and 2, the device (20) is formed from one piece of rigid, heat-resistant, plastic material, primarily used for peeling avocados and having a streamlined design, for easier washing and colored white, to see food particles to be washed off. The device (20) as shown has a handle (22), which is integrally connected at one end, to a base (24) of a blade member (28). The handle (22) is an elongated, flat-sided, rectangular member, with its front and back sides (50, 52) about three times as wide as its narrow sides (46, 48). The front side (50) of the handle (22) and the adjacent front side (54) of the blade member (28), are formed as a level surface. The back side (52) of the handle (22) is positioned away from the back side (38) of the blade member (28) and whereupon, the narrow sides (46, 48) of the handle (22) are substantially thicker than the edges (30, 34) of the blade member (28). The top (47) of the handle (22) is circular, while the other end of the handle (22), tapers into the base (24) from its back side (52) to the back side (38) of the blade member (28) and being integrally formed thereof. The device (20) is designed to be grasped by the hand, so that the front side (54) of the blade member (28) and the produce half (44), are more visible for peeling as shown in FIG. 4. The thumb grip (26) best seen in FIGS. 1 and 2, is an elongated recessed area, centered on the front side (50) of the handle (22) and aids in assuring a firm grip.

The base (24) of the blade member (28), is integrally formed relatively straight from one end of the elongated handle (22), as shown in FIGS. 1 and 2, with a slight curve beginning to then form from the base (24), remote from the front side (50) of the handle (22). The blade member (28) continues to increase in the degree of its curvature, to about the large spacing (42) located approximately at the middle of the blade member (28) and remains uniformly curved throughout the rest of its length, to a tip (36) of the blade member (28). Whereby a substantial portion of the free end of the blade member (28), conforms generally to the contour of a produce, allowing the bottom of the flesh of a produce half to be cut, without damaging the skin and the flesh thereto.

As best shown in FIG. 2, the blade member (28) includes a convex cutting edge (30) and a back edge (34), that border relatively equal lengths of the blade member (28). The convex cutting edge (30), is the primary edge for cutting and being along the length of the blade member (28), aids in fitting within the contours of the interior skin wall. Should the user tilt the blade member (28) at an angle against the skin wall, the convex cutting edge (30) will further aid to conform to the curvature of the produce skin. The back edge (34) can be used for cutting, but mainly serves to follow the convex cutting edge (30), as the trowel portion (32) bordering the back edge (34), smooths out small irregularities on the surface of the flesh.

As shown in FIG. 3, of cross-section line 40—40 of FIG. 2, the convex cutting edge (30) and the back edge (34) are round-faced and thereby being sufficiently blunt to prevent puncturing the skin of a produce, while still sharp enough to cut the flesh away from the skin. A substantial portion of the width of the blade member (28) is uniformly thinner than the back edge (34), with the side (31) of the trowel portion (32) abruptly sloping upward from the surface of the front side (54) of the blade member (28), forming a mound and blending into the back edge (34). Referring to FIGS. 1 and 2, the trowel portion (32) is largest near the base (24), gradually getting smaller along the length of the blade member (28) and then blending into the tip (36). The back edge (34) forms a relatively level surface with the adjacent narrow side (46) of the handle (22) and continues to be relatively straight from the top (47) of the handle (22), along the length of the blade member (28), to its tip (36).

The blade member (28) is substantially wide, offering a greater surface area, so that pressure against the skin wall, can be applied by the back (38) of the blade member (28), without breaking through the skin. Whereby such means, aids to guide and control the direction of the convex cutting edge (30) in a relatively parallel motion to the skin, as the user pushes the blade member (28) around the halved produce.

The width of the blade member (28), as shown in FIG. 2, having a relatively small spacing at its tip (36), widening to a relatively large spacing (42) near the middle of the blade member (28) and then narrowing to a relatively small spacing at the base (24). The back (38) of the blade member (28) puts pressure against the skin wall, with more pressure being applied at the large spacing (42) of the blade member (28). As shown in FIG. 4; in use, the large spacing (42) thereof, is positioned below the cut edge (56) of the skin (58) of an avocado half (44), thus reducing the pressure applied to the skin (58) on its cut edge (56) and aids to prevent breaking the skin (58) at the cut edge (56).

To peel a produce such as an avocado, firstly the avocado is cut in half lengthwise, then the pit is removed. Referring to FIG. 4, the user grasps the device (20) by the handle (22), in the right hand (55) and holds the avocado (44) in the palm of the left hand (57). With the front side (54) of the blade member (28) facing the avocado (44), the tip (36) of the blade member (28), is inserted between the skin (58) and the flesh (60), whereupon the blade member (28) is pushed down the interior wall of the skin (58). The tip (36) is rounded for less damage to the skin (58) when the blade member (28) is inserted.

The blade member (28) is then pushed completely around the avocado (44), with the cut edge (56) of the skin (58), relatively perpendicular to the convex cutting edge (30) of the blade member (28). The user keeps the back (38) of the blade member (28) flush against the interior of the skin (58) and remains tight thereon, which results in peeling close to the skin (58). The device (20) rotates once around the avocado (44) and cuts away the bottom as well as the sides of the flesh (60) thereof. The flesh (60) of the avocado (44), will then drop out of the skin (58) perfectly intact, when turned upside down over a plate.

SECOND EMBODIMENT OF THE INVENTION

Referring to FIG. 5, device (78) is a modified version of the invention, being a one piece metal tool, that can peel a variety of produce, but is especially adapted for peeling cantaloupe.

The convex cutting edge (76), back edge (74) and tip (88), include a beveled side (86). As shown in FIG. 7, of cross-section line 64—64 of FIG. 5, the blade member (72) has its front side (82) and its back side (80), parallel thereof. The beveled side (86) tapers forward from the back side (80) to the front side (82) of the blade member (72) and thereupon forming a sharp edge (84) thereof. The beveled side (86) aids to glide over the interior of the skin, while the sharp edge (84) that remains distant from the skin thereof, can effortlessly cut away the flesh from the skin of the produce. The blade member (72) can even be tilted, with the user gauging the distance of the sharp edge (84) from the surface of the skin wall.

The elongated handle (70), is semi-spherical at its free end (71) and has a substantially round perimiter, as shown in FIG. 6, of cross-section line 62—62 of FIG. 5 and aids in grasping the handle (70) in the fist (68) of the user, as shown in FIG. 8, when peeling such fruit as cantaloupe (66).

THIRD EMBODIMENT OF THE INVENTION

Referring to FIG. 9, device (94) is primarily used for peeling cantaloupe and is exactly like device (78), but with a second blade member (96) that is integrally formed from the base (98) of a main blade member (110), at one end of a elongated handle (100). Referring to FIGS. 9 and 10, the sides (106, 107) and the edges (116, 118) of the second blade member (96), taper to a sharp tip (102) at its free end. The back side (107) of the second blade member (96) is remote and parallel to the front side (119) of the main blade member (110) and creates a uniform gap (112) thereof. The second blade member (96) is relatively the same length as the main blade member (110), with both of their convex cutting edges (108, 116) spaced parallel, thereby simultaneously cutting the flesh of a produce. Whereas the back edge (118) of the second blade member (96) is concave and relatively the opposite in curvature as its convex cutting edge (116).

As shown in FIG. 10, of cross-section line 114—114 of FIG. 9, the second blade member (96) has its convex cutting edge (116) and back edge (118) evenly beveled from its sides (106, 107) and forming a sharp edge (104). The width of the second blade member (96) is relatively narrower than the main blade member (110).

In use, the second blade member (96) is guided by the main blade member (110) as it glides over the skin, with the back (120) of the main blade member (110) relatively flush to the skin, as it cuts the flesh thereupon. The second blade member (96) can then cut the flesh at a distance from the skin, which creates a relatively thin portion of the flesh, that can pass between the uniform gap (112). The second blade member (96) cuts a smaller circle within the larger circle, that is cut by the main blade member (110). The second blade member (96) is especially useful for cutting between the ripen orange flesh of a cantaloupe and its green flesh, that often lines the interior of the skin.

As shown in FIG. 11, the device (94) has partially peeled a wedged portion (122) of a cantaloupe, with the second blade member (96) having cut the ripen orange flesh (126) from the unwanted green flesh (128), that is adjacent the skin (124).

FORTH EMBODIMENT OF THE INVENTION

Referring to FIGS. 12 and 14, device (130) is another modified version of device (78), but is primarily used to peel melons, such as honeydew and watermelon. The device (130) has two beveled sides (142, 144) which converge to a sharp edge (146), forming the cutting edges (134, 136) of the blade member (138) and including a tip (140). The beveled side (144) being sufficiently large, to smoothly glide over the coarse pulp of the interior skin wall and even allows the user to tilt the blade member (138). As shown in FIG. 14, of cross-section line 148—148 of FIG. 12, the beveled sides (142, 144) are relatively equal, which aids in controlling the blade member (138) in a straight direction, thus making it easier for the user to steer the device (130).

Should the blade member (138) be tilted with the convex cutting edge (136) at an angle against the skin, the back edge (134) of the blade member (138) is concave and can comform much better to the general contour of the flesh, reducing the damage thereof.

FIFTH EMBODIMENT OF THE INVENTION

Referring to FIG. 13, device (150) is primarily used for peeling melons and is exactly like device (130), but having a thicker portion (152) bordering the length of the convex cutting edge (154) of the blade member (156) and including the tip (158).

As shown in FIG. 15, of cross-section line 160—160 of FIG. 13, a thin portion (168) forms substantially the width of the blade member (156). The front side (162) of the blade member (156), slopes upward from the thin portion (168) to a higher, flat area (164), which then blends into the beveled side (172) of the convex cutting edge (154), thereby forming the thicker portion (152) thereto. The convex cutting edge (154) has two beveled sides (172, 174) that come to a sharp edge (176), to effortlessly cut the flesh of a produce. The back edge (166) is concave along the length of the blade member (156), being round-faced thereof and used as a secondary cutting edge.

The thicker portion (152) allows for larger beveled sides (172, 174), while a substantial portion of the width of the blade member (156) still remains essentially thin, so that there is less pressure between the skin and the flesh, reducing damage to the flesh thereof.

Although not described herein, other methods of construction and design may be used in appling the teaching described herein.

I claim:

1. A produce peeling device in combination, comprised of:

a. an elongated handle integrally attached at a base of a blade member, for manually holding said blade member at said base thereof, said blade member extending forwardly from one end of the handle, so that a cutting edge of said blade member can be manually used to cut the flesh of a produce from its skin; and b. said blade member being relatively thin and wide thereof; having its front and back sides substantially flat in cross section, with the flat sides being relatively straight at said base, then curved remote from its front side, extending from said base to a tip of its free end and shaped to conform to the basic contour of a produce; said blade member having a portion of its width between its base and its tip, being at least as wide as the width of said base portion thereof; said blade member having said cutting edge extending substantially along its length of at least one edge thereof and including said tip, with said blade member having an anti-snag means to prevent said cutting edge from snagging on the skin, when said blade member is placed adjacent said skin; in use, the curved free end of said blade member, is of sufficient length wherein said blade member can be inserted between the skin and the flesh, with said cutting edge positioned relatively perpendicular to the cut edge of a produce half, whereupon said device is manually rotated around said produce half and pushing said cutting edge through said flesh, to simultaneously cut a substantial portion of the sides and bottom of said produce half and with a minimum of damage to said skin and said flesh thereof, thereby cutting said flesh out of said skin in one intact piece.

2. As in claim 1 wherein said blade member being relatively thin and wide thereof, the width of said blade member including a relatively large spacing located between said base and said tip of said blade member, whereby providing an aid for appling more pressure to the skin, below the cut edge of said skin.

3. As in claim 1 wherein said blade member being relatively thin and wide thereof, the width of said blade member having at least one edge convex shaped and located along a substantial portion of the length of said blade member, whereby the convex shaped edge aids in conforming to the general contour of a produce skin.

4. As in claim 1 wherein said cutting edge of said blade member can be manually used to cut the flesh of a produce from its skin; a trowel portion is provided being integrally formed and protruding from the front side of said blade member, spaced relatively parallel along a substantial portion of the length of said cutting edge thereof, whereby said trowel portion can aid in smoothing irregularities on the surface of said flesh, as it follows said cutting edge.

5. As in claim 1 wherein said elongated handle is integrally attached at a base of said blade member, for manually holding said blade member at said base thereof, and having a back edge of said blade member at a level surface with the adjacent narrow side of said handle and whereupon said device forms a relatively straight side thereof.

6. As in claim 1 wherein said cutting edge extending substantially along its length of at least one edge thereof and including said tip, with said cutting edge being round-faced, whereby said cutting edge is sufficiently blunt to prevent puncturing said skin, while still being sharp enough to cut said flesh with a minimum of damage thereof.

7. As in claim 1 wherein said blade member can be inserted between said skin and said flesh and a rounded tip is is provided on its free end, for less damage to the skin when said blade member is inserted thereof.

8. A produce peeling device in combination, comprised of:

a. an elongated handle integrally attached at a base of a blade member, for manually holding said blade member at said base thereof, said blade member extending forwardly from one end of the handle, so that a cutting edge of said blade member can be manually used to cut the flesh of a produce from its skin; and b. said blade member being relatively thin and wide thereof; having its front and back sides substantially flat in cross section, with the flat sides being relatively straight at said base, then curved remote from its front side, extending from said base to a tip of its free end and shaped to conform to the basic contour of a produce; said blade member having a portion of its width between its base and its tip, being at least as wide as the width of said base portion thereof; said blade member having said cutting edge extending substantially along its length of at least one edge thereof and including said tip, with said cutting edge having at least one beveled side forming a sharp edge, said sharp edge being sharp enough to cut the flesh of a produce, while one said beveled side is of sufficient size to glide over the skin, when said blade member is placed adjacent the skin; in use, the curved free end of said blade member, is of sufficient length wherein said blade member can be inserted between the skin and the flesh, with said cutting edge positioned relatively perpendicular to the cut edge of a produce half, whereupon said device is manually rotated around said produce half and pushing said cutting edge through said flesh, to simultaneously cut a substantial portion of the sides and bottom of said produce half and with a minimum of damage to said skin and said flesh thereof, thereby cutting said flesh out of said skin in one intact piece.

9. As in claim 8 wherein said blade member extending forwardly from one end of the handle, so that a cutting edge of said blade member can be manually used to cut the flesh of a produce from its skin and a second blade member is integrally formed at its base thereof, remote from the front side of said blade member, whereby said second blade member can cut the flesh of a produce, at a predetermined distance from the main blade member.

10. As in claim 8 wherein said blade member includes a concave edge located along a substantial portion of the length of said blade member thereof, and conforming to the general contour of said flesh of a produce, whereby said concave edge aids in preventing damage to said flesh, when said blade member is tilted relative to the skin.

11. As in claim 8 wherein said elongated handle is integrally attached at said base of said blade member, for manually holding said blade member at said base thereof and includes said handle having a substantially round perimeter in its width, whereby said elongated handle can be held more securely, in the fist of the user.

* * * * *